(12) United States Patent
Seward

(10) Patent No.: US 8,256,931 B2
(45) Date of Patent: Sep. 4, 2012

(54) ACHROMATIC HOMOGENIZER AND COLLIMATOR FOR LEDS

(76) Inventor: George H. Seward, Boston, MA (US)

(*) Notice: Subject to any disclaimer, the term of this patent is extended or adjusted under 35 U.S.C. 154(b) by 557 days.

(21) Appl. No.: 12/508,850

(22) Filed: Jul. 24, 2009

(65) Prior Publication Data

US 2010/0020565 A1 Jan. 28, 2010

Related U.S. Application Data

(60) Provisional application No. 61/083,389, filed on Jul. 24, 2008.

(51) Int. Cl.
*F21V 3/00* (2006.01)

(52) U.S. Cl. .......... 362/311.02; 362/231; 362/245; 362/249.02; 362/299; 362/555

(58) Field of Classification Search .......... 362/231, 362/245, 249.02, 268, 296.05, 299, 308, 362/311.02, 555
See application file for complete search history.

(56) References Cited

U.S. PATENT DOCUMENTS

| | | |
|---|---|---|
| 1,977,689 A | 10/1934 | Muller |
| 2,215,900 A | 10/1940 | Bitner |
| 4,698,730 A | 10/1987 | Sakai et al. |
| 5,757,557 A | 5/1998 | Medvedev et al. |
| 6,356,700 B1 * | 3/2002 | Strobl .......... 385/147 |
| 6,547,423 B2 | 4/2003 | Marshall et al. |
| 6,641,287 B2 | 11/2003 | Suehiro |
| 7,262,859 B2 | 8/2007 | Larson et al. |
| 7,474,474 B2 | 1/2009 | Angelini et al. |
| 7,494,228 B2 * | 2/2009 | Harbers et al. .......... 362/231 |

* cited by examiner

*Primary Examiner* — Stephen F Husar
(74) *Attorney, Agent, or Firm* — O'Connell Law Firm

(57) ABSTRACT

A lens arrangement with an achromatic homogenizer and collimator for multiple LEDs. The lens arrangement combines the hemispherical emittance profiles from one or more LEDS into a collimated beam without chromatic aberration. The lens arrangement has one or more LEDs, a homogenizer, a solid lightpipe, an internal parabolic reflector, a retroreflector, and a refractor. The emittance profiles of the LEDs are distributed evenly over space and angle by multiple reflections inside a diffusely reflecting cavity of the homogenizer. The internal reflector has a numerical aperture of 1.0, which defines a hemispherical solid angle of collection within air. The retroreflector directs rays away from the LEDs. The retroreflection permits space for the electronics of high radiance LEDs. The refractor converts the retroreflector rays in a plurality of shapes. The lens is optimally designed for applications with high standards for color mixing, uniformity, and efficient conversion of electrical power into light.

24 Claims, 3 Drawing Sheets

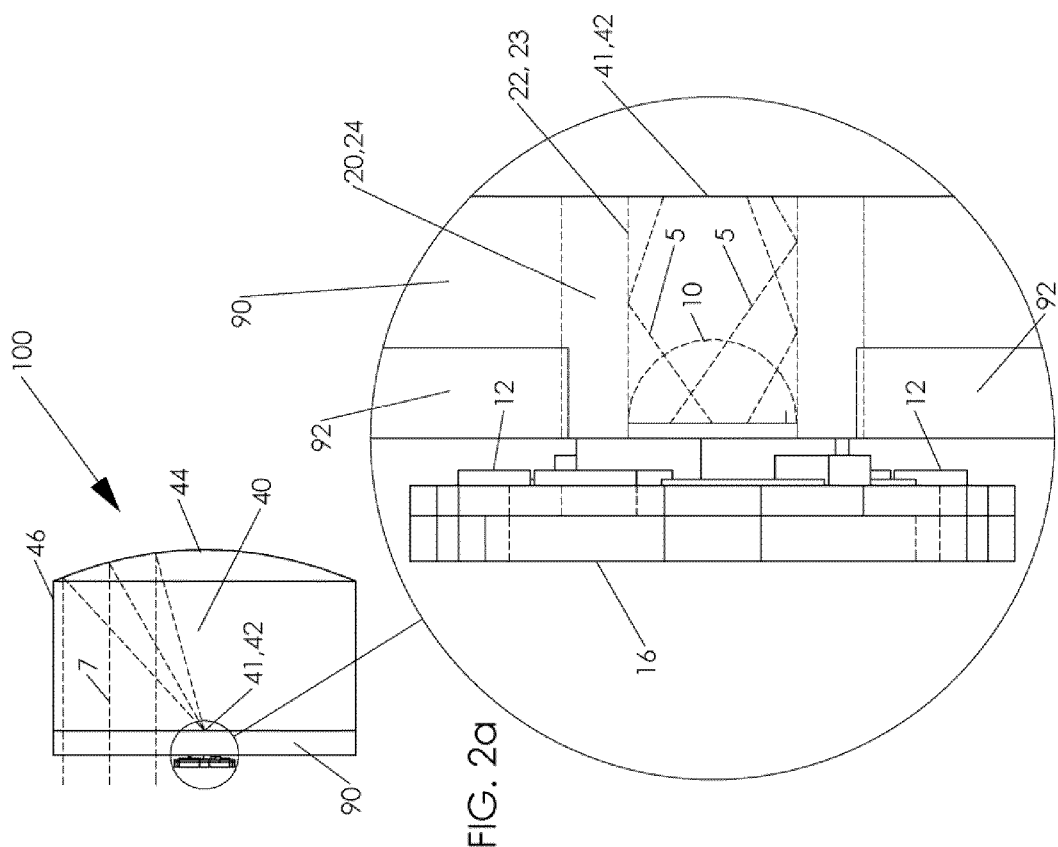
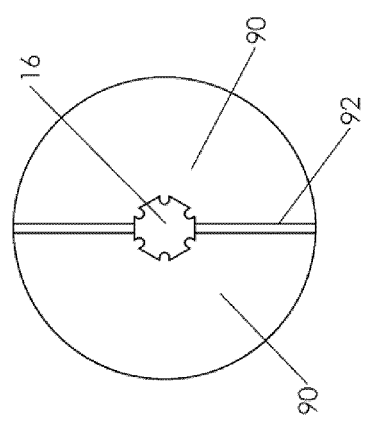
FIG. 2a
FIG. 2b

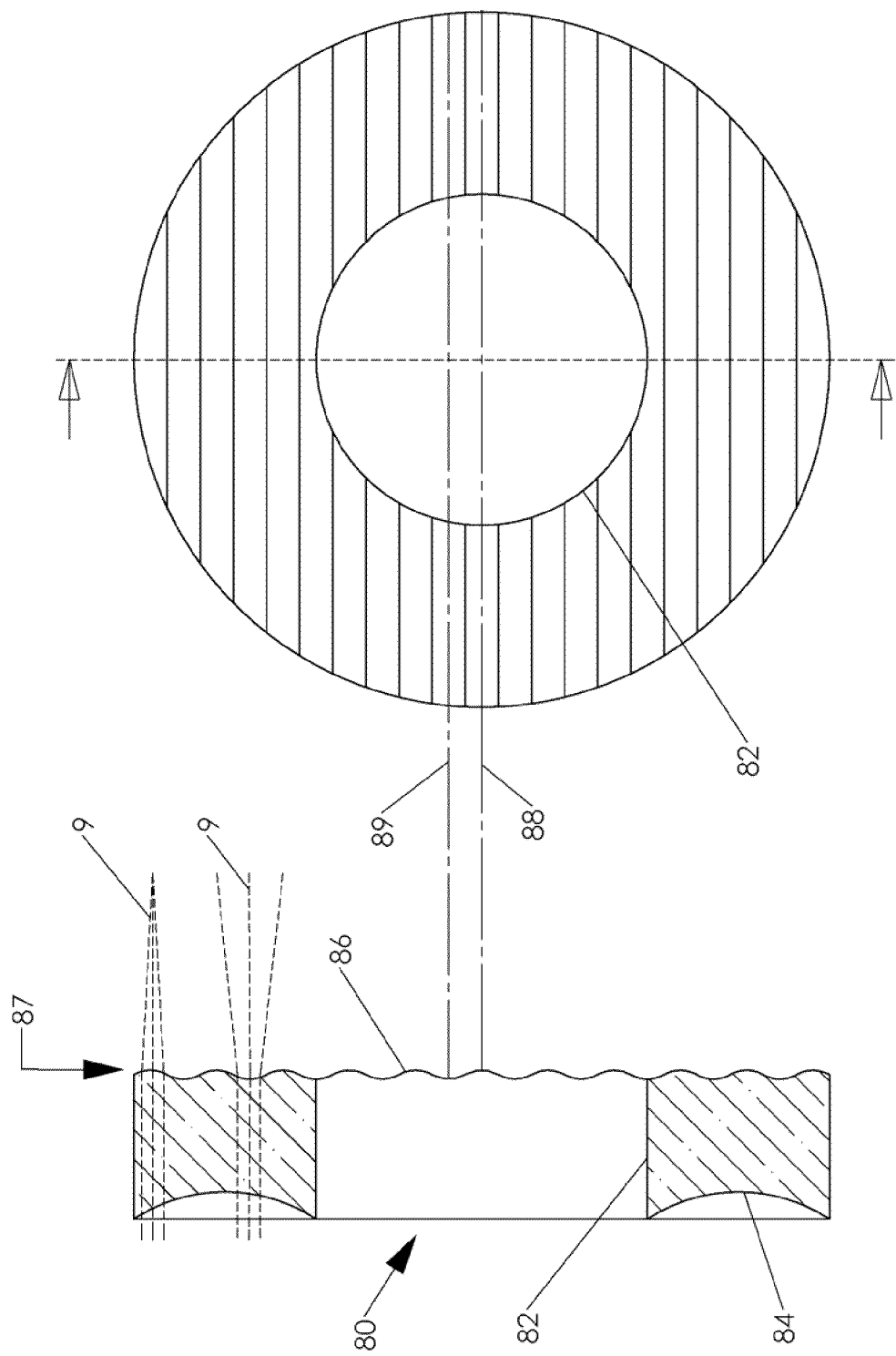

ACHROMATIC HOMOGENIZER AND COLLIMATOR FOR LEDS

FIELD OF THE INVENTION

LED lighting offers significant improvements over incandescent and fluorescent light fixtures. The lumens per watt of an LED are far greater than a tungsten bulb. The temporal response of an LED is preferred over a fluorescent bulb. High radiance monochromatic LEDs offer lower cost per lumen in production than other LEDs. Color mixing is more easily tailored with multiple monochromatic LEDs. LEDs do not produce toxic mercy during disposal. LEDs are not prone to ballast failure or filament damage. LEDs are growing in radiance while shrinking in cost. A lens is required for these high brightness LEDs.

BACKGROUND OF THE INVENTION

Numerous configurations exist for an LED lens with a central refractor and an annular internal reflector. A parabolic reflector by itself has existed for more than a century. There are numerous patents directed to combinations of an internal reflector and a refractor. For example, in U.S. Pat. No. 1,977,689, Muller discloses a signal lamp for railroads employing a central refracting lens and an annular internal parabolic reflector as an improvement over metallic parabolic reflectors. The internal reflection of the annular collector is impervious to corrosion. Under the teachings of U.S. Pat. No. 2,215,900 to Bitner, the addition of several annular refractors greatly reduces the diameter of the parabolic reflector. Still further, an LED mounted at the focal plane of a concave mirror is claimed as a novel combination in U.S. Pat. No. 6,641,287 to Suehiro. An annular parabolic cap as taught in U.S. Pat. No. 4,698,730 to Sakai et al. collimates exiting light from the cylindrical surface of the LED lens. In U.S. Pat. No. 5,757,557 to Medvedev et al., a cylindrical void defines a collection angle beyond a hemisphere within an annular reflector and a central refractor. Still further, under the teachings of U.S. Pat. No. 6,547,423 to Marshall et al., a cylindrical void contains a convex refractor while the central refractor and the annular reflector share a planar exit face. There are numerous combinations of parabolic reflectors and refractors. Open windows for cooling are taught in U.S. Pat. No. 7,474,474 to Angelini et al.

A homogenizer distributes rays evenly throughout both space and angle. An integrating sphere may combine multiple inputs into a single output with excellent homogeneity throughout wavelength, space, and angle. A homogenizer may also be a hollow lightpipe, or a solid lightpipe. Diffuse reflectance greatly improves the distribution of rays throughout space and angle.

As shown below, a hemispherical emission is transformed by Snell's law of refraction into a much smaller angle within a refractive medium.

$$\sin \theta_n = 1/n$$

Consequently, the angle of internal collection $\theta_n$ is much easier to collimate than a 90° angle within air.

The hemispherical collection efficiency can be determined as set forth below:

$$HCE = 2\sin^2 \frac{\theta}{2}$$

It can thus be appreciated that there is much more power per angle at higher angles. A central portion of the collection may be rejected in favor of other attributes as in U.S. Pat. No. 7,262,859 to Larson. The angle of collection is defined by the margin of lens. The marginal ray travels through the margin of the lens.

The optical power of transmission is much different than the optical power of internal reflection. At an air-to-glass interface (n=1.0, 1.5), the optical power of transmission can be determined as follows:

$$\phi_T = 0.5\left(\frac{1}{R}\right).$$

The optical power of an internal reflection is determined by the equation:

$$\phi_{IR} = 3\left(\frac{1}{R}\right) = 6\phi_T.$$

Thus, a radius for internal reflection has 6 times the optical power a radius for transmission. An internal reflector provides much more optical power per radius than a radius in transmission. Internal reflection employs a much longer radius than refraction at the same optical power.

As the brightness of an LED increases, the power supply becomes physically larger. A larger surface area is required for dissipation of heat. The electrical power source can be larger than the LED optics. This provides an opportunity for a larger optic.

A retroreflector normally comprises three orthogonal surfaces. A hollow reflector relies upon the large refractive index of a metal. A solid retroreflector relies upon total internal reflection. A retroreflector may also have just two reflecting surfaces.

The critical angle defines the internal angle at which the external angle is 90°. For example, the critical angle within a glass of index 1.5 in contact with air is 41.8°. At this internal angle of collection, the external angle collection is a hemisphere.

In an illustrative example, a fresh snow pack can nearly double the exposure of a person to UV light. This effect is due to numerous water-to-air facets with reflectance of approximately 2%. The diffuse reflectance of a non-absorbing dielectric approaches 100% as concentration of facets increases and the depth increases.

Thermoplastic resin reflectance material, such as that sold under the registered trademark SPECTRALON by Labsphere, Inc. of North Sutton, N.H. can be machined into a wide variety of shapes for the fabrication of optical components. The reflectance material gives the highest diffuse reflectance of any known material or coating over the UV-VIS-NIR region of the spectrum. The reflectance is generally >99% over a range from 400 nm to 1500 nm and >95% from 250 nm to 2500 nm and is resistant to UV degradation with NIST traceable calibration.

It will further be noted that the human eye can withstand only 5 mW of coherent radiation within the pupil. However, some LEDs exceed this limit. Therefore, LED illumination must be sufficiently spread over space to avoid discomfort or even damage to the human eye. A larger exit aperture can address the comfort of human vision.

SUMMARY OF THE INVENTION

The present invention is founded on the basic object of providing a lens arrangement that homogenizes and collimates emittance from one or more LEDs.

This and in all likelihood further objects and advantages of the present invention will become obvious not only to one who reviews the present specification and drawings but also to those who have an opportunity to make use of an embodiment of the achromatic homogenizer and collimator for LEDs disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

Under the present invention, the hemispherical emittance from one or more LEDS 10 is combined into a collimated beam without chromatic aberration. The lens arrangement can include an integration block 20, an internal lightpipe 30, an internal reflector 40, a retroreflector 50, and a refractor 60.

The integration block 20 functions as an achromatic homogenizer. The integration block 20 comprises one or more entrance ports 22 for the LEDs 10. Rays 5 within the cavity 24 are distributed uniformly in space angle by the diffusely reflecting integration block 20. The wall thickness of the integration block 20 is sufficient to create a nearly 100% reflectance.

The entrance aperture 32 of the lightpipe 30 is proximal to the cavity 24 of the integration block 20. The refractive index of the lightpipe 30 is near 1.5. The maximum angle of rays 6 with the axis of the lightpipe 30 is 41.8° as derived from the critical angle for total internal reflection.

An internal reflector 40 has focal point 41 defined by a parabolic reflecting surface 44. The entrance aperture 42 of the internal reflector 40 is collated with the exit aperture 34 of the lightpipe 30. The immersion focal length of the internal reflector 40 is approximately 5 times the width of the lightpipe 30. Collimated rays 7 exit the internal reflector 40.

The retroreflector 50 is defined by a first reflector 51 and a second reflector 52. The retroreflector 50 converts rays 7 traveling toward the LEDs 10 into rays 8 traveling away from the LEDs 10. This retroreflection allows space for the LEDs 10 and electronics. Collimated rays 7 and 8 of the retroreflector 50 are substantially free from chromatic aberrations.

The first refractor 60 converts the retroreflected rays 8 into shaped rays 9. The first refractor 60 may be flat, tilted, convex, concave, or diffuse. The corresponding shaped rays 9 are collimated, deflected, convergent, divergent, or diffuse. Different types of refractors 60, 84, and 86 may be interchangeable. This allows customization for varied applications.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawings:

FIG. 2a is a partially sectioned view in side elevation of an alternative embodiment of the lens arrangement;

FIG. 2b is a view in rear elevation of the lens arrangement of FIG. 2;

FIG. 3a is sectioned view in side elevation of an embodiment of the annular lens; and FIG. 3b is front view of an embodiment of the annular lens.

DETAILED DESCRIPTION OF PREFERRED EMBODIMENTS

Figure 1:
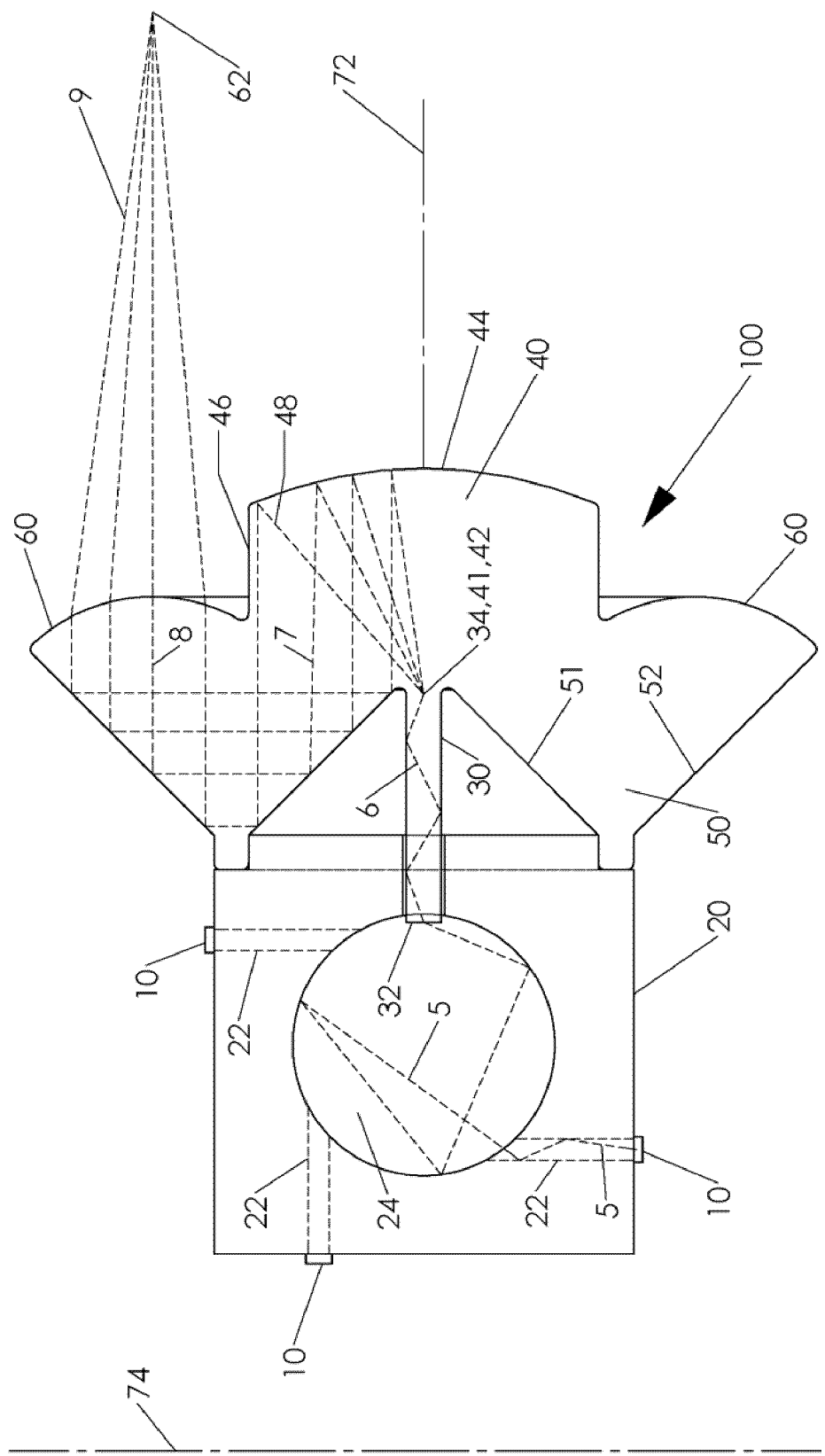
FIG. 1 is a partially sectioned view in side elevation of a lens arrangement according to the present invention.

It will be appreciated that the lens construction disclosed herein is subject to widely varied embodiments. However, to ensure that one skilled in the art will be able to understand and, in appropriate cases, practice the present invention, certain preferred embodiments of the broader invention revealed herein are described below and shown in the accompanying drawing figures. Before any particular embodiment of the invention is explained in detail, it must be made clear that the following details of construction, descriptions of geometry, and illustrations of inventive concepts are mere examples of the many possible manifestations of the invention.

In FIG. 1, an embodiment of the lens arrangement disclosed herein is indicated generally at 100. The lens arrangement 100 in the depicted embodiment has two or more LEDs 10, an integration block 20, a solid lightpipe 30, an internal reflector 40, a first reflector 51, a second reflector 52 and a first refractor 60.

The LEDs 10 emit rays 5 over multiple wavelength ranges. Independent control over current for each LED 10 promotes an optimum combination of wavelengths. High power LEDs 10 require space for solder pads 12, a heat sink 16, and potentially other electronics.

An integration block 20 comprises multiple hollow light pipes 22 and a cavity 24. Rays 5 are guided by the hollow lightpipes 22 into the cavity 24. Rays 5 are distributed in both linear and angular space by circulation within cavity 24. Rays 5 are contained within the hollow lightpipe 22 and cavity 24 by diffuse reflectance.

A solid lightpipe 30 has an entrance aperture 32 and exit aperture 34. Rays 6 from the cavity 24 enter the lightpipe 30 through the entrance aperture 32. The rays 6 within the lightpipe 30 are guided by total internal reflection.

The internal reflector 40 has an entrance aperture 41, a focal point 42, a reflecting surface 44, and a margin 46. The focal point 42 is coincident with the exit aperture 30 of the solid lightpipe and the entrance aperture 41 of the internal reflector 40. The reflecting surface 44 is coated with a metallic such as aluminum with a silicon-dioxide overcoat. The angle of the marginal ray 48 is defined by the focal length and the margin 46. The ideal shape of the reflecting surface 44 is a parabola. The practical limit of the marginal ray 48 is 41°. This defines a numerical aperture (NA) as follows:

$NA = 1.5 \sin 41° = 1.0$

This numerical aperture defines a hemisphere within the air of the cavity. Thus, the internal parabolic reflector collects light over a hemisphere within the cavity 24. The hemispherical collection efficiency is 100%. The ratio of the margin half-width to the internal focal length is approximately tan 41°.

The rays 7 exit the reflecting surface 44 of the internal reflector 40 as collimated. The rays 7 are reflected by a first reflector 51 and a second reflector 52. The first reflector 51 and the second reflector 52 create retroreflected rays 8 which are directed away from the LEDs 10 and electronics. The retroflection enables space for LED electronics and fixtures. A first refractor 60 converts the retroreflected rays 8 into shaped rays 9 as desired. A focal point 62 of the first refractor 60 may be located on either side of the first refractor 60.

The elements of the lens arrangement 100 may be disposed in several formats. The elements may be swept around a circular axis 72 as displayed in FIG. 1. This can create a circular profile similar to that of a spotlight. The elements may be swept around a toroidal axis 74. This presents a barrel profile in similarity to lighthouse. The elements may be extruded along a third axis at normal to both the circular axis 72 and the toroidal axis 74. This creates a linear rectangular profile similar to an overhead fluorescent lamp.

The collection efficiency of the solid lightpipe 30 is countered by absorption at the LEDs 10. Any light returning to the LED 10 is subject to absorption. A portion of the absorption is re-emitted. The LEDs 10 represent both a sink and a source to the integration block 20.

The current invention promotes uniformity throughout wavelength space and angle with several sinks. The LEDs 10 define a sink. Surface defects in molded parts define sinks. However, the uniformity of the lens arrangement 100 may have application in filmmaking, office lighting, museum lighting, home lighting, and similar lighting circumstances. The sinks may be considered a cost of uniformity.

FIG. 2a displays a second embodiment of the lens arrangement 100. There, the optical ystem lens arrangement 100 includes one or more LEDs 10, an integration block 20, and an internal reflector 40. Multiple emitters can be present in the LED 10. The integration block 20 is defined by a hollow lightpipe 22. Rays 5 are contained within the hollow lightpipe 22 by the high index of a metallic film 23 or body 24. The focal point 42 of the internal reflector 40 is coincident with the entrance aperture 41 of the internal reflector 40. The rays 7 exit the reflecting surface 44 of the internal reflector 40 as collimated. An annular window 90 mounts to an exit face of the internal reflector 40.

As shown in FIG. 2b, the annular window 90 contains a groove 92 for wires (not shown) from the solder pads 12 of the LED 10. The annular window 90 could also define the hollow lightpipe 22 and a metallic film 23. A heat sink 16 of the LED 10 may be mounted to a glass window 90 for additional conduction of heat and to permit mounting without blocking light.

As shown in FIG. 3a, an annular lens 80 with a central aperture 82 and a second refractor 86 can be employed pursuant to the invention. The second refractor 86 can mate precisely to the first refractor 60. A transparent adhesive may eliminate the air void between them.

The central aperture 82 can mate precisely to the margin 46 of the internal reflector 40. This enables different curvatures of the second refractor 86 and the first refractor 60. Consequently, the second refractor 86 can modify the divergence of the lens assembly 100. A third refractor 86 also acts as the exit face of the annular lens 80. There are numerous possibilities for the shape of the third refractor 86, including spherical, aspheric, lens array, and cylindrical. Variations of the annular lens 80 may be interchangeable towards optimization of the illumination field.

As shown in FIG. 3a, a third refractor 86 may occur in the shape of a cylindrical lens array 87. As shown in FIG. 3b, the crest 88 of a cylindrical lens array 87 displays a direction. A third refractor 86 may converge light across the crest 88 of the cylindrical array 87, and the third refractor 86 may diverge light across the trench 89 of the cylindrical lens array 87. Both of these actions spread the shaped rays 9 across the crest 88 of the cylindrical lens array 87. The cylindrical lens array 87 is smooth and continuous as indicated by an absence of shape edges within the path of the shaped rays. Ergo, there is no scattering by edges, which is a common problem in a Fresnel lens.

Ideally, the second refractor 84 should mate to the first refractor 60. In the configuration of FIG. 3, the concave second refractor 84 should precisely match the convex first refractor 60. The annular lens 80 may rotate about the circular axis 72 for direction of the shaped rays 9 of the cylindrical lens array 87.

With certain details and embodiments of the present invention disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

I claim as deserving the protection of Letters Patent:

1. A lens arrangement comprising:
   at least one LED;
   an integration block with at least one entrance port, a cavity, and at least one exit port; and
   an internal reflector with an entrance aperture;
   wherein rays travel from the at least one LED through the integration block to the entrance aperture of the internal reflector.

2. The lens arrangement of claim 1 wherein the internal reflector has a focal point located substantially at the entrance aperture of the internal reflector.

3. The lens arrangement of claim 2 wherein the internal reflector has a numerical aperture of approximately 1.0.

4. The lens arrangement of claim 3 further comprising a solid lightpipe disposed between the integration block and the internal reflector.

5. The lens arrangement of claim 4 wherein a first reflecting surface is placed in a path of rays from the internal reflector.

6. The lens arrangement of claim 5 wherein a second reflecting surface is placed in a path of rays from the first reflecting surface.

7. The lens arrangement of claim 6 wherein a first refractor is placed in a path of rays from the second reflecting surface.

8. The lens arrangement of claim 7 wherein the first reflector and the second reflector define a retro-reflector.

9. The lens arrangement of claim 8 wherein the first refractor is placed in a path of rays from the retro-reflector.

10. The lens arrangement of claim 9 wherein an annular lens is placed in path of the rays from the first refractor.

11. The lens arrangement of claim 10 wherein the annular lens comprises a second refractor and a third refractor.

12. The lens arrangement of claim 11 wherein the first and second refractors have approximately matching curvatures.

13. The lens arrangement of claim 11 wherein the third refractor is a lens array.

14. The lens arrangement of claim 13 wherein the lens array is smooth and continuous.

15. The lens arrangement of claim 13 wherein the lens array comprises an array of cylindrical lenses.

16. The lens arrangement of claim 10 wherein the annular lens is interchangeable with alternative annular lenses.

17. The lens arrangement of claim 1 wherein the integration block comprises a hollow lightpipe.

18. The lens arrangement of claim 17 wherein the internal reflector has an exit face and further comprising an annular window mounted to the exit face of the internal reflector.

19. The lens arrangement of claim 18 wherein the hollow lightpipe is disposed within the annular window.

20. A lens arrangement for use with a source of illumination, the lens arrangement comprising:
   an integration block with at least one entrance port, a cavity, and at least one exit port; and
   an internal reflector with an entrance aperture;
   wherein rays travel from the source of illumination through the integration block to the entrance aperture of the internal reflector.

21. The lens arrangement of claim 20 further comprising a source of illumination wherein the source of illumination comprises an LED.

22. The lens arrangement of claim 20 wherein the internal reflector has a focal point located substantially at the entrance aperture of the internal reflector.

23. The lens arrangement of claim 20 further comprising a solid lightpipe disposed between the integration block and the internal reflector.

24. The lens arrangement of claim 20 wherein the integration block comprises a hollow lightpipe.

* * * * *